United States Patent [19]

Thrash et al.

[11] Patent Number: 5,915,317

[45] Date of Patent: Jun. 29, 1999

[54] AUTOMATED GANTRY-TYPE STITCHING SYSTEM

[76] Inventors: Patrick J. Thrash, 17101 Springdale St., #103, Huntington Beach, Calif. 92649; Jeffrey L. Miller, 520 Hermosa Ave., #5, Hermosa Beach, Calif. 90254; Kenneth G. Pallas, 4235 Level Side Ave., Lakewood, Calif. 90712; Robert C. Trank, 2123 Brackenridge Trail, Belvedere, Ill. 61008; Rhoda Fox, 5596 Rotary Rd., Cherry Valley, Ill. 61016; Mike Korte, 1824 Remington Rd., Rockford, Ill. 61108; Richard Codos, 34 Casale Dr. South, Warren, N.J. 07060; Aleksandr Korolev, 234 Country Club La., Scotch Plains, N.J. 07076; William Collan, 34 Pinehill Rd., Englishtown, N.J. 07726

[21] Appl. No.: 08/995,635

[22] Filed: Dec. 22, 1997

[51] Int. Cl.$^6$ .............................. D05B 21/00; D05B 25/00
[52] U.S. Cl. ................................ 112/470.13; 112/475.08; 112/155
[58] Field of Search .......................... 112/470.13, 470.12, 112/470.01, 475.08, 155, 117, 118, 2

[56] References Cited

U.S. PATENT DOCUMENTS

| | | | |
|---|---|---|---|
| 3,312,184 | 4/1967 | Cash | 112/118 |
| 3,515,080 | 6/1970 | Ramsey | 112/470.13 |
| 4,067,276 | 1/1978 | Mohilo et al. | 112/220 |
| 4,092,938 | 6/1978 | Coughenour | 112/457 |
| 4,104,976 | 8/1978 | Landau, Jr. | 112/470.02 |
| 4,285,293 | 8/1981 | Martling | 112/281 |
| 4,331,091 | 5/1982 | Parker et al. | 112/475.08 |
| 4,429,364 | 1/1984 | Maruyama et al. | 364/470.08 |
| 4,446,520 | 5/1984 | Shigeta et al. | 364/470.08 |
| 4,481,507 | 11/1984 | Takuguchi et al. | 340/679 |
| 4,503,788 | 3/1985 | Giannuzzi et al. | 112/470.06 |
| 4,506,611 | 3/1985 | Parker et al. | 112/79 |
| 4,776,291 | 10/1988 | Tajima et al. | 112/98 |
| 4,786,343 | 11/1988 | Hertzbert | 156/93 |
| 4,798,152 | 1/1989 | Simons et al. | 112/470.05 |
| 4,815,404 | 3/1989 | Ellermann et al. | 112/470.01 |
| 4,843,986 | 7/1989 | Kozuka et al. | 112/163 |
| 4,873,931 | 10/1989 | Takagi et al. | 112/470.01 |
| 4,876,973 | 10/1989 | Marrache et al. | 112/470.13 |
| 4,899,287 | 2/1990 | Hulshoff et al. | 364/470.07 |
| 4,917,756 | 4/1990 | Cahuzac et al. | 156/429 |
| 4,992,317 | 2/1991 | Chess et al. | 428/102 |
| 5,218,916 | 6/1993 | Kurono et al. | 112/102.5 |
| 5,239,475 | 8/1993 | Shigeta et al. | 364/470.08 |
| 5,287,820 | 2/1994 | Stutznacker | 112/117 |
| 5,299,519 | 4/1994 | Hirabayashi | 112/456 |
| 5,341,755 | 8/1994 | Kawasaki | 112/163 |
| 5,379,226 | 1/1995 | Shigeta | 364/470.08 |
| 5,383,417 | 1/1995 | Norrid | 112/278 |
| 5,392,724 | 2/1995 | Kurono et al. | 112/102.5 |
| 5,473,535 | 12/1995 | Shigeta et al. | 364/191 |
| 5,474,001 | 12/1995 | Tajima et al. | 112/102.5 |
| 5,510,994 | 4/1996 | Tsonis et al. | 364/470.08 |
| 5,515,798 | 5/1996 | Cahuzac | 112/470.12 |
| 5,537,945 | 7/1996 | Sugihara et al. | 112/470.06 |
| 5,543,005 | 8/1996 | Monget et al. | 156/93 |

*Primary Examiner*—Peter Nerbun
*Attorney, Agent, or Firm*—Westerlund & Powell, P.C.; Robert A. Westerlund; Raymond H. J. Powell, Jr.

[57] ABSTRACT

A stitching system includes a gantry that is movable along a material support table. Mounted to the gantry are a plurality of stitching heads and bobbins. The stitching heads are individually controllable in a z-direction, and the bobbins are individually controllable in the z-direction. Each stitching head is paired with a bobbin. Each pair of stitching heads and the bobbins is controlled synchronously in the z-direction. The stitching system is well-suited for stitching preforms of aircraft wing covers and other preforms having variable thickness and compound, contoured three-dimensional surfaces.

33 Claims, 9 Drawing Sheets

AUTOMATED GANTRY-TYPE STITCHING SYSTEM

This invention was made under contract no. NAS1-18862 awarded by NASA. The Government has certain rights in this invention.

BACKGROUND OF THE INVENTION

This invention relates to textile manufacturing. More specifically, this invention relates to a computer numerically controlled machine for stitching a large fiber-reinforced preform having variable thickness.

Large aircraft structures such as wing covers are now being fabricated from textile composites. The textile composites are attractive because of their potential for lowering the cost of fabricating the large aircraft structures. Cutting pieces of fabric and stitching the fabric pieces together has the potential of being less expensive than cutting sheets of aluminum, drilling holes in the aluminum sheets, removing excess metal and assembling metal fasteners.

The wing cover can be made from a carbon-fiber textile composite. Sheets of knitted carbon-fiber fabric are cut out into pieces having specified sizes and shapes. Fabric pieces having the size and shape of a wing are laid out first. Several of these pieces are stacked to form the wing cover. Additional pieces are stacked to provide added strength in high stress areas. After the fabric pieces are arranged in their proper positions, the pieces are stitched together to form a wing preform. Secondary details such as spar caps, stringers and intercostals are then stitched onto the wing preform. Such a wing preform might have a thickness varying between 0.05 inches and 1.5 inches. The wing preform is quite large, and its surface is very complex, usually a compound contoured three-dimensional surface.

The wing preform is transferred to an outer mold line tool that has the shape of an aircraft wing. Prior to the transfer, a surface of the outer mold line tool is covered with a congealed epoxy-resin. The tool and the stitched preform are placed in an autoclave. Under high pressure and temperature, the resin is infused into the stitched preform and cured. This results in a cured wing cover that is ready for assembly into a final wing structure.

For textile composite technology to be successful, two barriers must be overcome: cost and damage tolerance. Damage tolerance appears to have been hurdled. Closely-spaced stitches on the wing preform provide sufficient damage tolerance because the stitches provide a third continuous column of material.

Cost continues to be the problem. An exceedingly large number of stitches must be made on the wing preform. A computer numerically controlled ("CNC") stitching machine might be required to make eight to ten stitches per inch, in rows that might be spaced 0.1 inches to 0.5 inches apart, over a surface that might be longer than forty feet and wider than eight feet. The total number of stitching points on the wing preform might exceed 1.5 million. Moreover, the stitches must be of high quality.

None of the conventional stitching machines are suited for making stitches in a surface as complex as a compound, contoured three-dimensional surface. None of the conventional stitching machines allow such a large preform to be fed to stitching heads. None of the conventional stitching machines make the quality of stitch required for aircraft preforms—a loose, modified Federal 301 Type Lock Stitch that is locked on the bottom surface of the preform. None of the conventional stitching machines are fully automated to perform stitching functions such as adjusting thread path geometry, adjusting thread tension, thread cutting, thread dragging and needle cooling. Machine operators would be required to constantly stop the machine, perform functions such as cutting thread and adjusting thread tension, and then restart the stitching machine. The manual labor of the machine operator adds to the cost of manufacturing and slows the time to manufacture the preform. Time and resources expended correcting operator errors also adds to the cost of manufacturing.

Based on the foregoing, it can be appreciated that there exists a need for a stitching machine that can make high-quality stitches in large preforms, especially preforms having compound, complex three-dimensional surfaces. There also exists a need for a stitching machine that can make the stitches quickly. There also exists a need for a stitching machine that requires little to no operator intervention.

SUMMARY OF THE INVENTION

The invention can be regarded as a stitching system comprising a gantry positioned with respect to a three-dimensional coordinate system having x,y,and z axes, wherein the x and y axes are perpendicular to each other and lie in a first plane, and wherein the z axis lies in a second plane that is perpendicular to the first plane, a plurality of stitching heads mounted to the gantry; and a plurality of bobbins mounted to the gantry. Each one of the stitching heads is paired with a bobbin. The system further comprises means for individually controlling movement of each of the stitching heads in a z-direction parallel to the z-axis; and means for individually controlling movement of each of the bobbins in the z-direction. Each pair of stitching heads and the bobbins is controlled synchronously in the z-direction.

The invention can also be regarded as a stitching system comprising a stitching machine including a gantry and a plurality of stitching heads mounted to the gantry; a material support table including a plurality of table sections, each table section being independently movable between an extended and a retracted position; means for moving the gantry along the material support table; and means for controlling the table sections to move between the extended and retracted positions. A table section is moved from the extended position to the retracted position to allow passage of the gantry. A table section is moved from the retracted position to the extended position after the gantry has passed.

BRIEF DESCRIPTION OF THE DRAWINGS

The above and other objects, features and advantages of the present invention will become apparent from the following detailed description taken in conjunction with the accompanying drawings, in which.

DETAILED DESCRIPTION OF THE INVENTION

While the present invention is described herein with reference to the illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
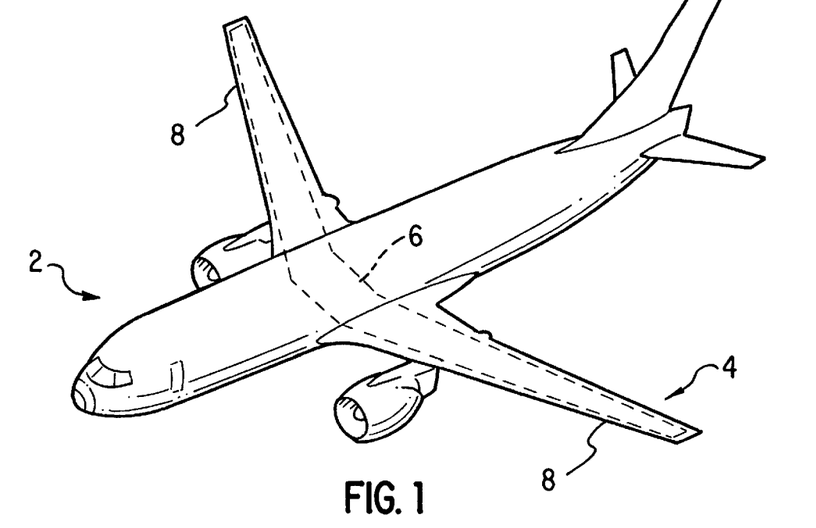
FIG. 1 is an illustration of an aircraft.

FIG. 1 shows a commercial aircraft 2. The commercial aircraft 2 includes a final wing structure 4 including a wing box 6 and two semi-wing spans 8. Wing covers for the wing box 6 and the semi-wing spans 8 are fabricated from stitched preforms that are infused with a resin film. Each preform is made of a carbon-fiber composite. The preforms for the wing covers of the semi-wing spans 8 might be at least forty feet long and at least four feet wide. Surfaces of the wing covers are very complex, e.g.—compound contoured three-dimensional surfaces.

Figure 2:
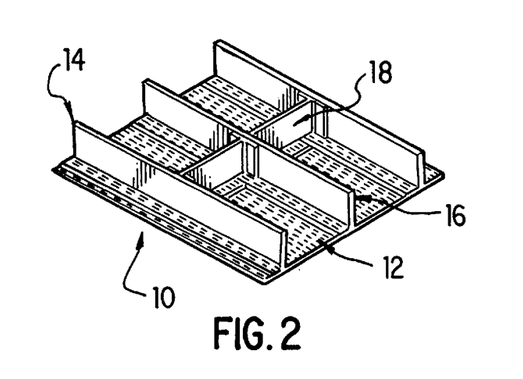
FIG. 2 is an illustration of a portion of a preform for a wing cover of the aircraft.

FIG. 2 shows a portion of a stitched preform 10 for the aircraft 2. Several fabric pieces 12 are stacked to form the wing cover. Additional pieces are stacked to provide added strength in high stress areas. Secondary details such as spar caps 14, stringers 16 and intercostals 18 are also stacked onto the preform 10. Resulting in a preform 10 that might have a thickness varying between 0.05 inches and 1.5 inches.

Figures 3, 3A:
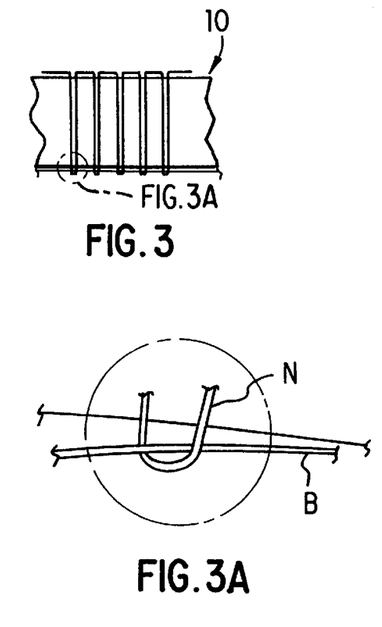
FIG. 3 is an illustration of a loose, modified Federal Type 301 Lock Stitch.

The stitches in the preform 10 can be a loose modified Federal Type 301 Lock Stitch, which is locked at the bottom surface instead of the middle of the preform (see FIG. 3). The stitches are formed with a needle thread N made of a composite material such as "Kevlar" having a weight between 400 and 1600 denier, and the stitches are locked with a bobbin thread B.

Figure 4:
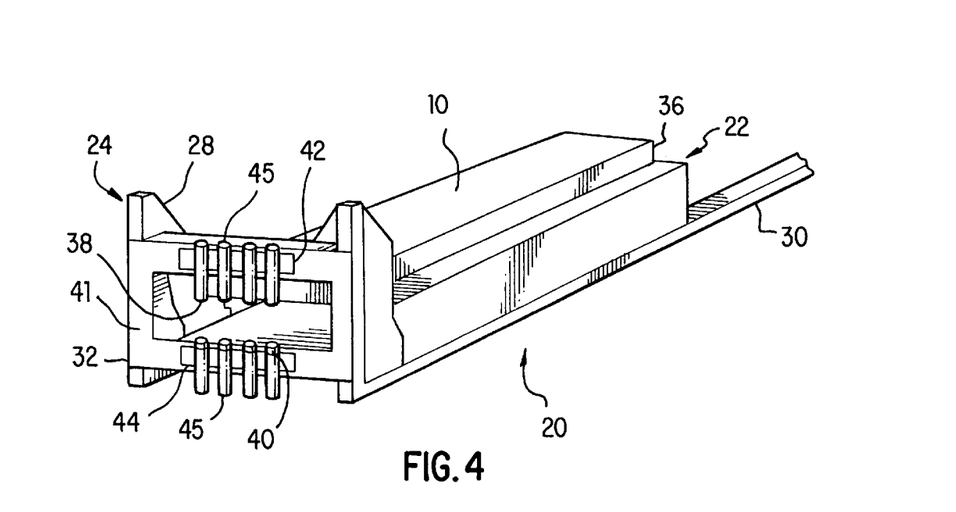
FIG. 4 is a perspective view of a material support table and a stitching machine for stitching a preform of the wing cover.
Figure 5:
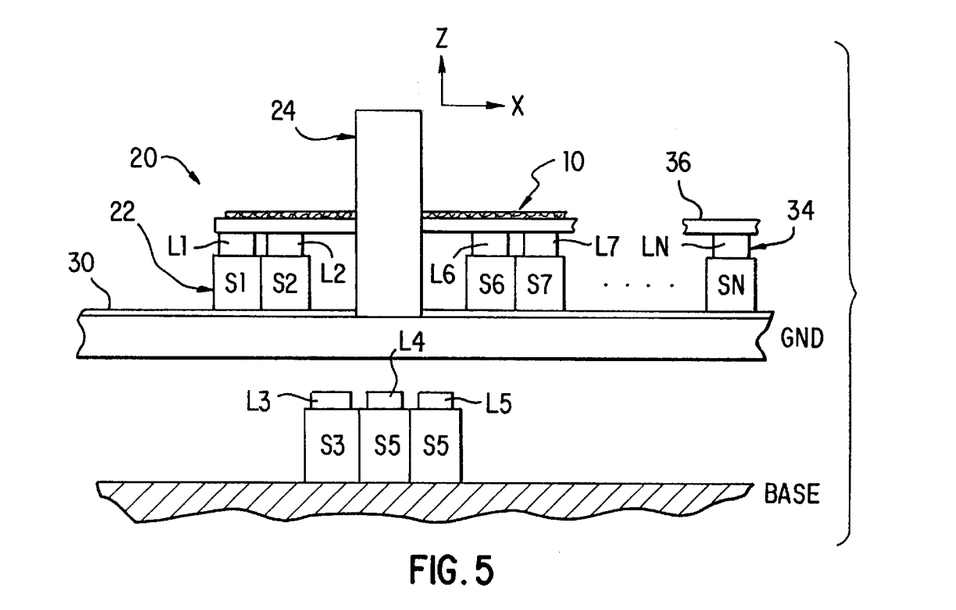
FIG. 5 is a schematic diagram of the stitching machine and the material support table.
Figure 6:
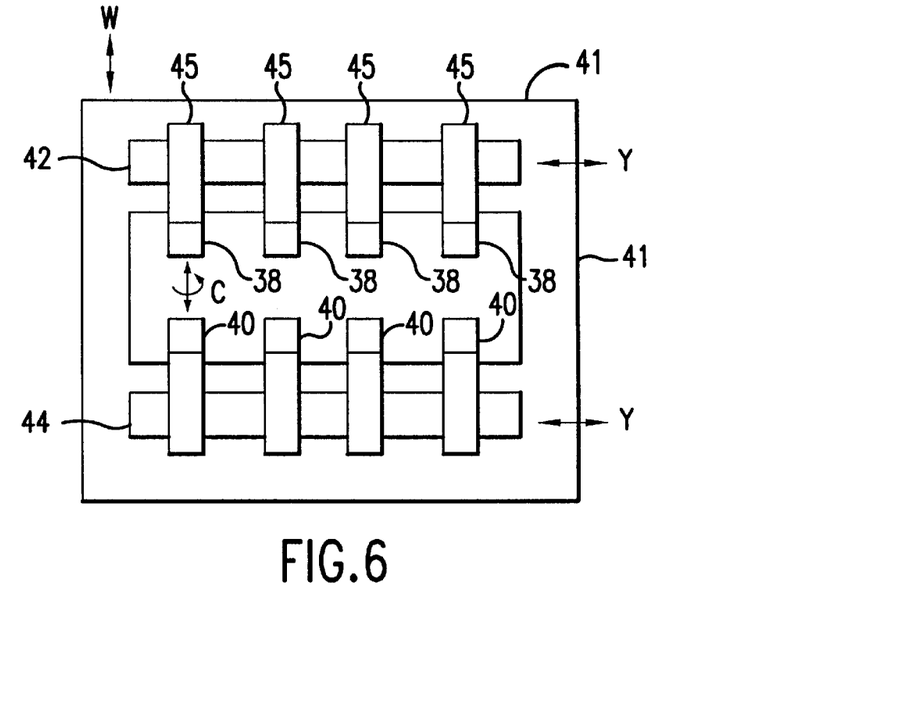
FIG. 6 is a schematic diagram of a gantry, which forms a part of the stitching machine.

FIGS. 4, 5 and 6 show an automated stitching system 20 including a material support table 22, a gantry-type stitching machine 24 for stitching the preform 10 and a control station 26 (not shown) for controlling the material support table 22 and the stitching machine 24. The stitching machine 24 includes a gantry 28 that is movable along the length of the material support table 22. The gantry 28 is guided by rails 30 and can be moved by means such as hydraulic or pneumatic pistons, or by electromechanical actuators.

The material support table 22 provides a surface for supporting the preform 10. The material support table 22 includes a plurality of sections S1 to Sn. Each table section S1 to Sn can be independently moved between a retracted position and an extended position. Resting atop the surface of the material support table 22 is tooling 34, which includes a plurality of loft modules L1 to Ln. Each loft module L1 to Ln is bolted to a table section S1 to Sn. Thus, a loft module L1 to Ln is moved along with the table section S1 to Sn to which it is bolted. The tooling 34 matches the loft surface of the wing cover. Mounted atop the tooling 34 is a stitching frame 36 to which the preform 10 is clamped. The stitching frame 36, which spans the table sections S1 to Sn, remains stationary throughout stitching.

At the start of stitching, the stitching machine 24 is positioned at the beginning of the material support table 22, and all of the table sections S1 to Sn are in their extended positions. A table section S1 to Sn is moved from the extended position to the retracted position to clear the gantry 28 and to allow the gantry to pass. The loft module L1 to Ln drops with the table section S1 to Sn to which it is bolted. After the gantry 28 has passed, the table section S1 to Sn is moved from the retracted position to the extended position.

FIG. 5 shows the stitching machine with three table sections S3, S4, S5 in fully retracted positions and four other table sections S1, S2, S6, S7 in fully extended positions. The stitching frame 36 supports the preform where table sections S3, S4, S5 are retracted. As the gantry 28 moves along the rails 30, table section S6 is moved to a fully retracted position. After the gantry 28 has passed table section S3, table section S3 is moved to the fully extended position.

The stitching system is located on multiple floors of a building: a ground floor GND and a basement BASE. The stitching machine 24 and the control station 26 are located entirely on the ground floor GND. The table sections S1 to Sn, when fully retracted, are located entirely in the basement BASE. Means for extending and retracting the table sections S1 to Sn are also located in the basement BASE. Electromechanical actuators, hydraulic pistons or pneumatic pistons can be used for moving the table sections S1 to Sn between the extended and retracted positions. Such a multi-level arrangement allows the material support table 22 to be serviced conveniently.

The stitching machine 24 further includes a plurality of stitching heads 38 mounted to the gantry 28 and a plurality of bobbins 40 secured to the gantry 28. The stitching heads 38 are above the preform 10 and the bobbins 40 are below the preform 10. Each one of the stitching heads 38 is paired with a bobbin 40. Although four pairs of stitching heads 38 and bobbins 40 are shown, the stitching machine 24 can be designed with any number of pairs of stitching heads 38 and bobbins 40.

The gantry 28 includes a bridge 41 that is movable in a w-direction, upper and lower sliders 42 and 44 that are movable in a y-direction, and a ram 45 for each of the stitching heads 38 and bobbins 40, each ram 45 being movable in a z-direction and a c-direction (see FIG. 6). The bridge 41 moves all of the stitching heads 38 and the bobbins 40 together as a group in the w-direction. The upper slider 42 moves the stitching heads 38 together as a group in the y-direction, and the lower slider 44 moves the bobbins 40 together as a group in the y-direction. Each ram 45 moves a stitching head 38 or a bobbin 40 in the z-direction (translational) and the c-direction (rotational about the z-direction). The gantry 28 is movable in the x-direction. Therefore, the stitching heads 38 and bobbins 40 are all movable together as a group in the x-direction.

Figure 7:
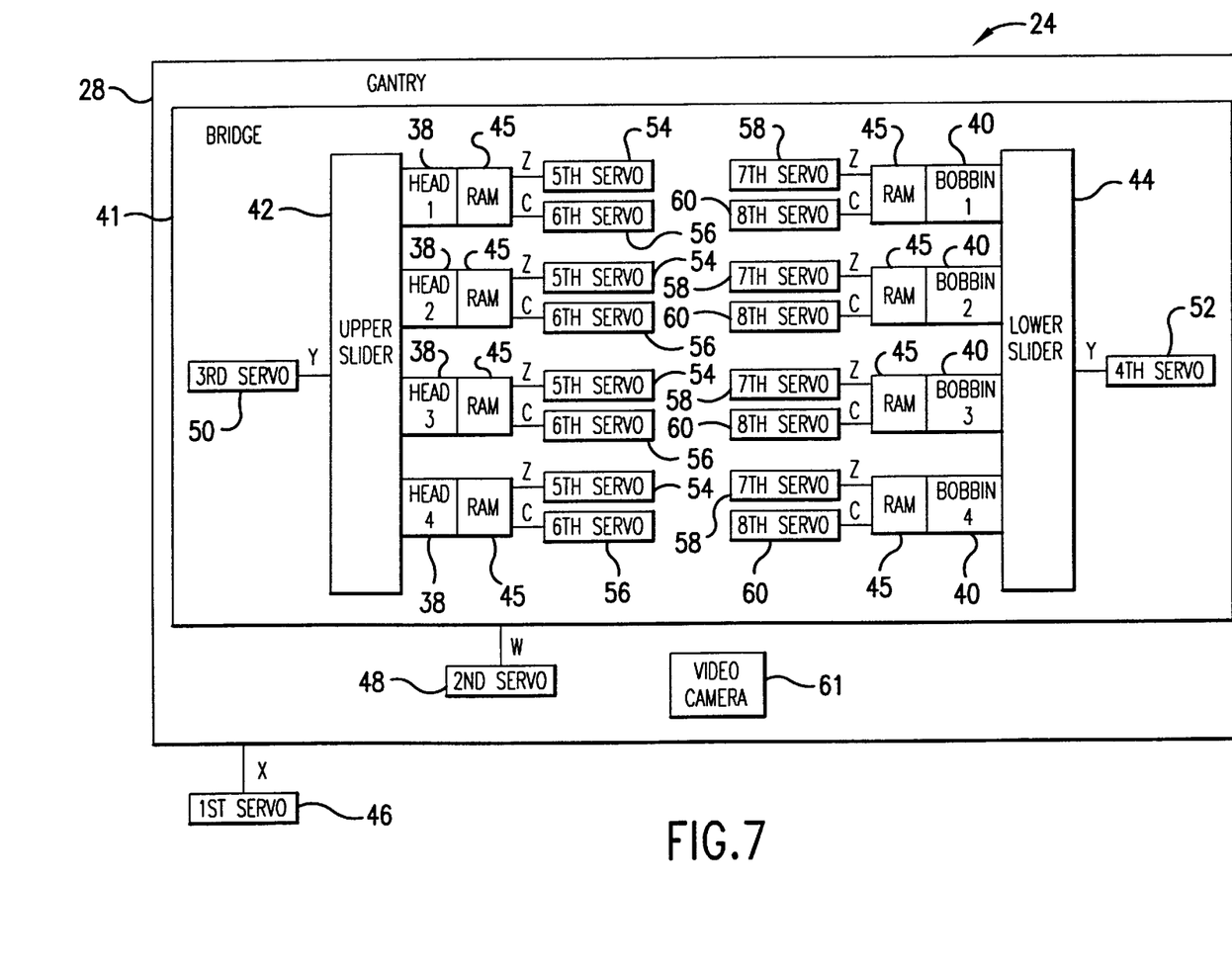
FIG. 7 is a schematic diagram of servomechanisms for the stitching machine.
Figure 8A:
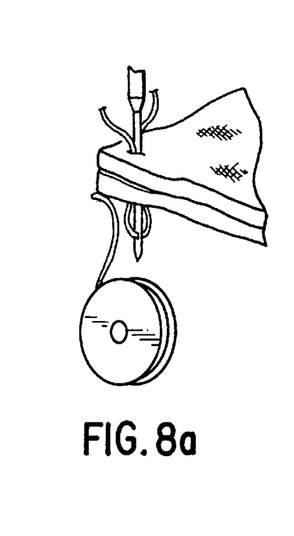
FIGS. 8a to 8e are illustrations of a stitching head and a bobbin cooperating to make a lock stitch.
Figure 8B:
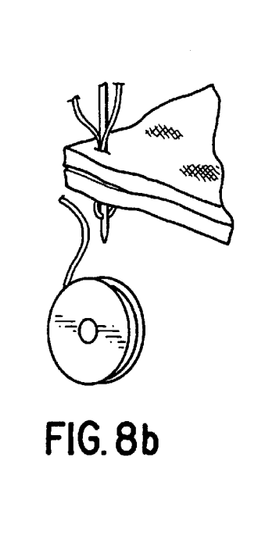
Figure 8C:
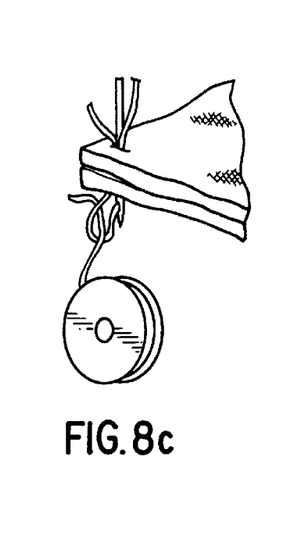
Figure 8D:
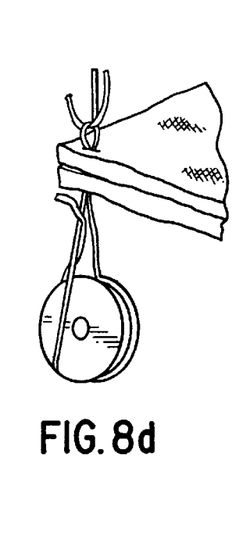
Figure 8E:
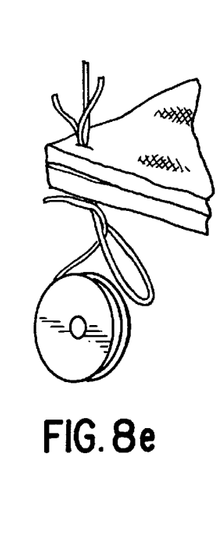

Referring now to FIG. 7, the stitching machine 24 further includes a first servo-controlled mechanism 46 for moving the gantry 28 in the x-direction; a second servo-controlled mechanism 48 for moving the bridge 41 in the w-direction; a third servo-controlled mechanism 50 for moving the upper slider 42 in the y-direction; and a fourth servo-controlled mechanism 52 for moving the lower slider 44 in the y-direction. Each stitching head 38 has fifth and sixth servo-controlled mechanisms 54 and 56 for moving its ram 45 in the z-and c-directions, and each bobbin 40 has seventh and eighth servo-controlled mechanisms 58 and 60 for moving its ram 45 in the z- and c-directions. The servo-controlled mechanisms 46 to 60 can include stepper motors mounted to the gantry 28. If additional degrees of freedom are desired, additional servo-controlled mechanisms can be provided.

The servo-controlled mechanisms 46 to 60 are independently controlled by the control station 26. However, each pair of stitching heads 38 and bobbins 40 is moved synchronously in the z-and c-directions. That is, each pair is moved together in the z- and c-directions. A video camera 61 can also be provided for monitoring each pair of stitching heads 38 and bobbins 40.

To make a stitch at a stitching point, the gantry 28 moves the stitching heads 38 and bobbins 40 as groups to the x-coordinate of the stitching point, and the upper and lower sliders 42 and 44 move the stitching heads 38 and bobbins 40 as groups to their respective y-coordinates. One pair of stitching heads 38 and bobbins 40 will be positioned over the y-coordinate of the stitching point. Depending upon the contour of the preform 10, the bridge 41 might also move the stitching heads 38 and bobbins 40 together as groups in the w-direction, thereby performing a coarse adjustment with respect to the vertical. The stitching head/bobbin pair over the z-coordinate of the stitching point is moved synchronously in the z- and c-directions (the other pairs of stitching heads 38 and bobbins 40 might be moved synchronously in the z- and c-directions as well). Once positioned over the stitching point, the stitching head/bobbin pair cooperates to form a lock stitch as illustrated in FIGS. 8a to 8e.

Figure 9:
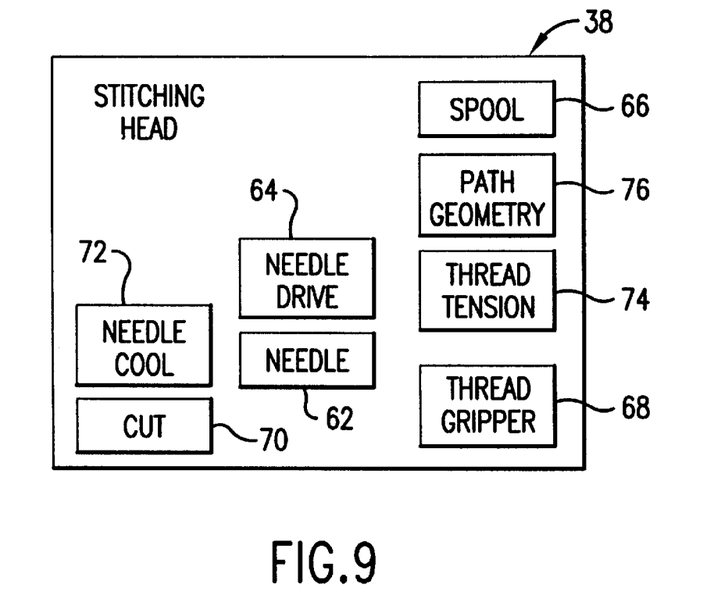
FIG. 9 is a block diagram of a stitching head, which forms a part of the stitching machine.

FIG. 9 shows the components of the stitching head 38. The stitching head 38 includes a needle 62, a needle drive mechanism 64 including a slider crank mechanism and a needle bar for positive and negative reciprocation of the needle 62, and a spool 66 of thread for the needle 62. The thread is drawn from the spool 66 and threaded through an eye of the needle 62. Additionally, the stitching head 38 includes the following mechanisms: a thread gripper 68 for automatically gripping a tail of needle thread hanging down from the needle 62; a thread cutter 70 for automatically cutting the needle thread; a needle cooler 72 for automatically cooling the needle 62; a mechanism 74 for automatically adjusting tension of the thread; and a mechanism 76 for automatically adjusting thread path geometry. Operation of the needle drive mechanism 64, the thread gripper 68, the thread cutter 70, the needle cooler 72, the thread tensioning mechanism 74 and the thread path geometry mechanism 76 are all controlled automatically by the control station 26. Such a stitching head 38 is disclosed in U.S. Ser. No. 08/996,412 filed concurrently herewith and incorporated herein by reference. However, the stitching head 38 need not utilize all of the mechanisms described above. For example, the stitching head 38 might only utilize the needle drive mechanism 64 and the needle cooler 72.

Figure 10A:
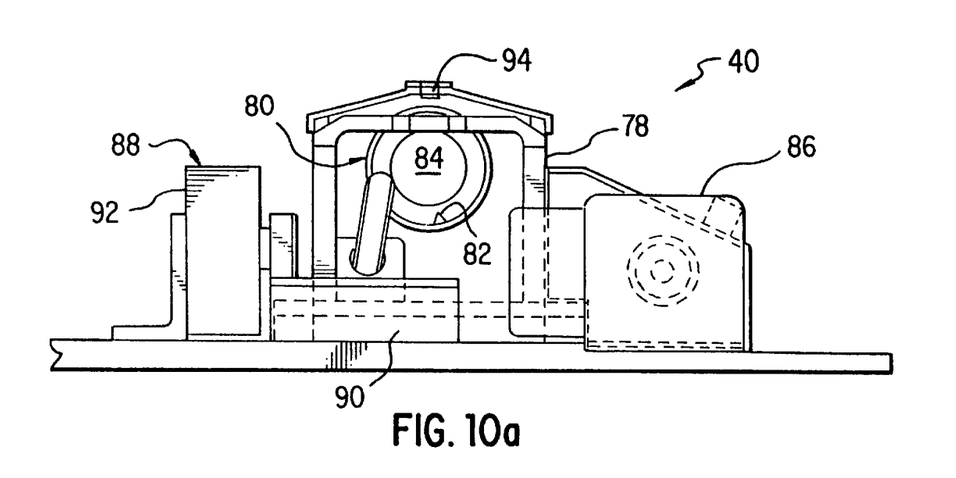
FIGS. 10a and 10b are illustrations of a bobbin, which forms a part of the stitching machine.
Figure 10B:
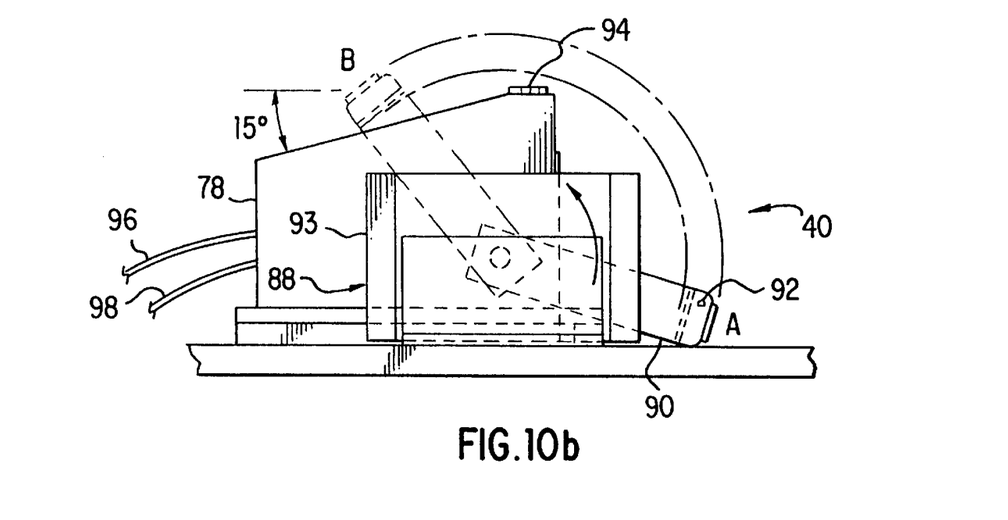

FIGS. 10a and 10b show the bobbin 40 in greater detail. The bobbin 40 includes a bobbin case 78, a conventional loop-forming mechanism 80 inside the bobbin case 40, and a drive 86 for the loop-forming mechanism 80. The loop-forming mechanism 80 includes a hook 82 and a spool of bobbin thread 84. The bobbin 40 further includes a thread cutter 88 for automatically cutting the bobbin thread. The thread cutter 88 includes a bobbin arm 90 pivotable between a low position A and a high position B, a coil 92 of nichrome wire at a free end of the bobbin arm 90, and a motor 93 for moving the coil 90 between the low and high positions A and B. The motor 93 is controlled by the control station 26.

At the top of the bobbin case 78 is a hardened, elongated conical bushing 94, which guides the needle 62 into the bobbin case 78. The bushing 94 guides the needle 62 to the hook 82 so that the loop can be picked up.

The upper surface 95 of the bobbin case 78 is beveled. Beveling the upper surface 95 allows stitches to be made in a preform portion that is not laying flat on the material support table 22. Beveling the upper surface 95 of the bobbin case at a fifteen degree angle, for example, allows the stitches to be made in the preform 10, even though portions of the preform are angled by as much as fifteen degrees from the flat surface.

A first air line 96 delivers a jet stream of air into the bobbin case 78. The jet stream frees carbon fibers and other residue inside the bobbin case 78. A second hose 98 extends into the bobbin case 78 and provides suction, which removes the carbon fibers and other residue inside the bobbin case 78. Carbon fibers are electrically conductive; if airborne fibers come in contact with an electrical supply, for example, the fibers might short out the power supply.

The bobbin 40 cuts the bobbin thread as follows. The bobbin 40 is retracted from the preform 10 by a couple of inches, pulling down a tail while it is being retracted. The bobbin arm 90 swings forward, from the low position A towards the high position B, and drags the bobbin thread with it. As soon as the bobbin arm 90 reaches the high position B, it hits a proximity switch (not shown), which causes the coil 92 of Nichrome wire to heat up and cut the bobbin thread. The bobbin arm 90 retracts back to the low position A, and the bobbin 40 is extended back to the preform 10, resulting in a long tail that allows the bobbin thread to remain locked by the stitch.

Figure 11:
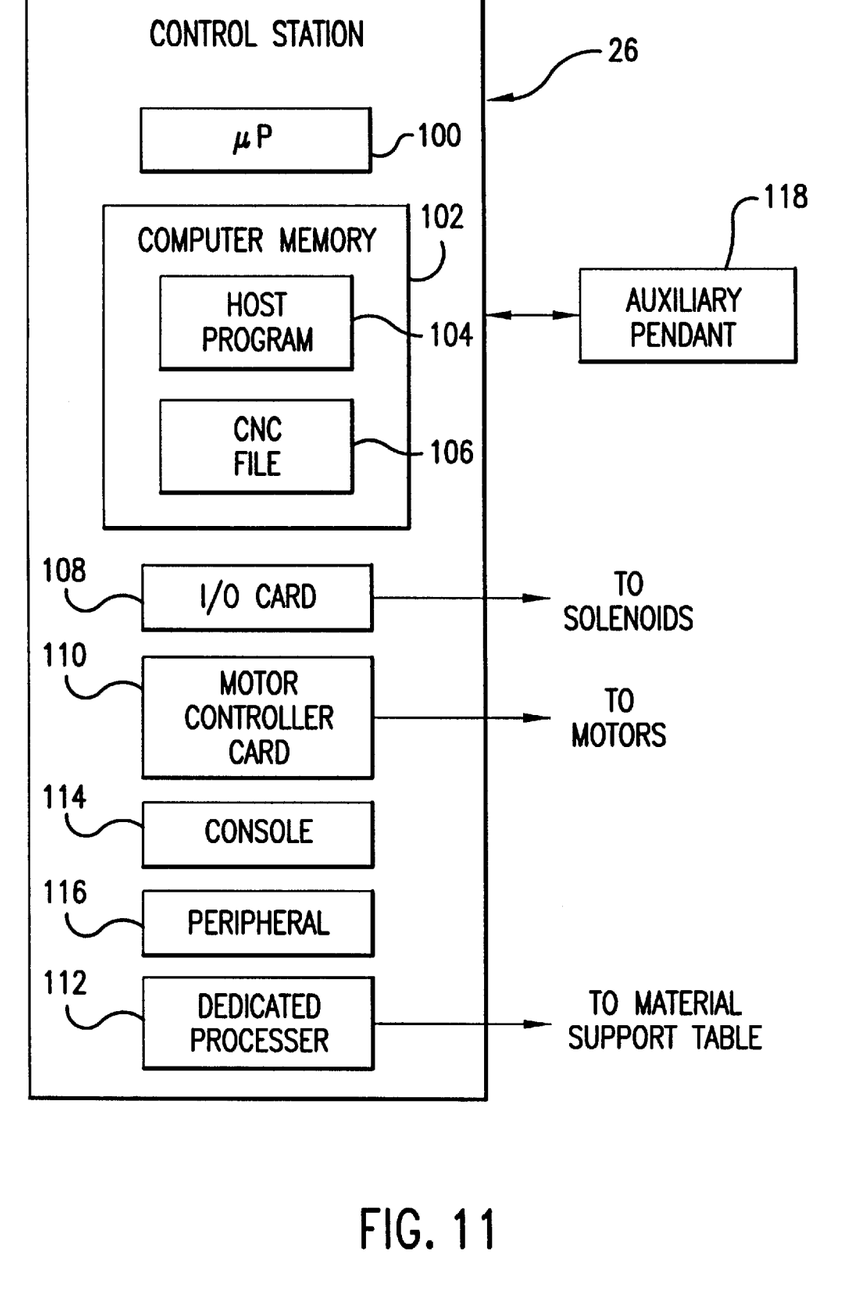
FIG. 11 is a block diagram of a control station for the material support table and the stitching machine.

FIG. 11 shows the control station 26 for controlling the stitching machine 24 and the material support table 22. Located remotely from the stitching machine 24, the control station 26 includes a processor 100 and computer memory 102. Encoded in the computer memory 102 is a host program 104 and at least one file 106 including CNC instructions for making the stitches, controlling stitching speed, and positioning the stitching heads 38 and bobbins 40 to and from the preform 10. Each file 106 also includes CNC instructions for commanding the unique functions of the stitching head 38: instructions for the needle cooler 72, instructions for the thread gripper 68, instructions for the thread cutter 70, instructions for the thread path geometry mechanism 76, and instructions for the thread tensioning mechanism 74.

The processor 100 executes the host program 104, which instructs the processor 100 to fetch the CNC instructions from the file 106 and respond to the CNC instructions. When a CNC instruction is fetched, the processor 100 generates a command that is sent to an I/O card 108 or a motion controller card 110. When the I/O card 108 receives a command it generates a control signal having an appropriate voltage level for an actuator such as solenoid. When the motion controller card 110 receives a command, it generates a control signal having an appropriate voltage level for an actuator such as a stepper motor. For example, the processor 100 fetches a CNC instruction for making a stitch, and sends position commands to the motion controller card 110. The motion controller card 110 sends control signals to the stepper or servo motors of the stitching machine 24, or the processor 100 fetches a CNC instruction for turning on needle cooling, and sends a command to the I/O card 108, which generates a control signal that turns on a solenoid actuator of the needle cooler 72.

The control station 26 further includes a table controller 112 such as a dedicated processor or a programmable logic controller for controlling the material support table 22. The table controller 112 is responsible for monitoring the position of the gantry 28 along the material support table 22, and extending and retracting the table sections S1 to Sn to allow the gantry 28 to move along the material support table 22.

The control station 26 further includes an operator console 114 including a display and keyboard for controlling the stitching machine 24, viewing stitching data, and viewing status and health of the stitching machine 24. A peripheral device 116 such as a floppy disk drive, CD ROM drive or tape drive allows the host program 104 and the file 106 to be loaded into the computer memory 102. In the alternative and the host program 104, the file 106 could be downloaded from a network. The file 106 could even be entered from the operator console 114.

An auxiliary pendant 118 is attached to the gantry 28. The auxiliary pendant 28 allows an operator to control the stitching machine 24, view stitching data, and view status and health of the stitching machine 24 from a location that is remote from the control station 26.

Figure 12:
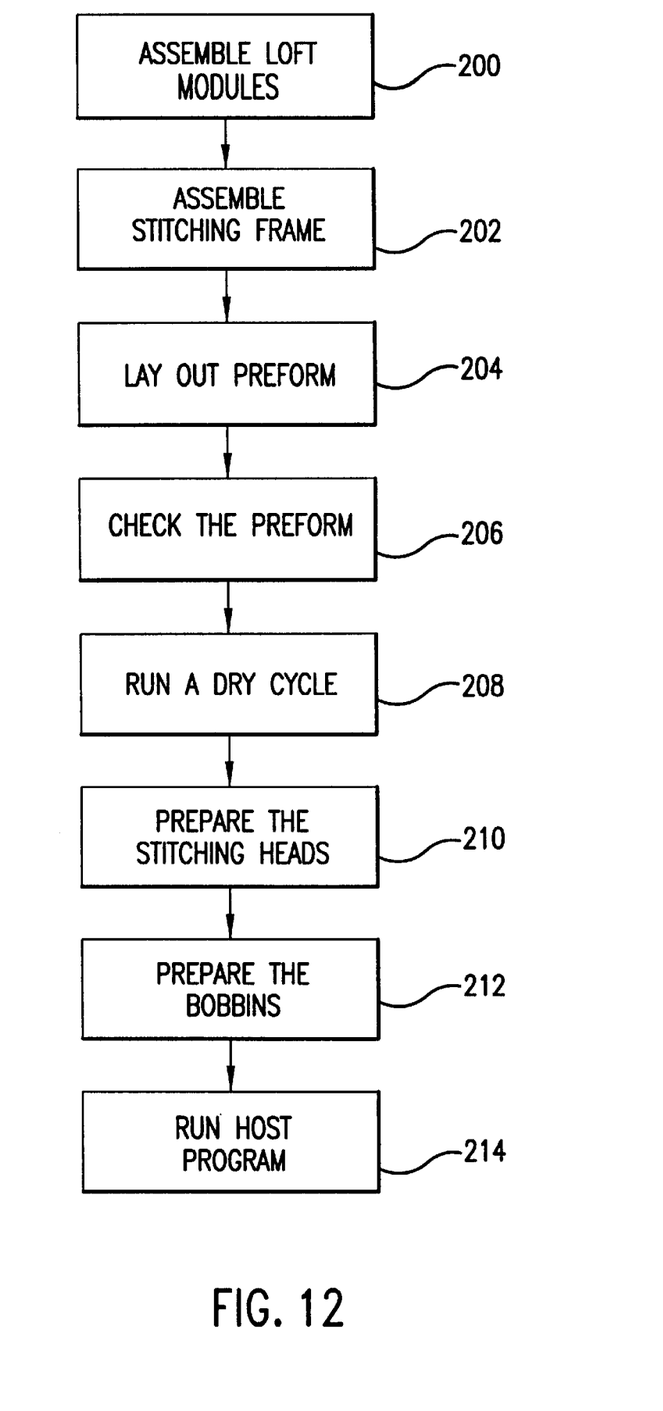
FIG. 12 is a flowchart of a method of operating the material support table and the stitching machine.

FIG. 12 shows the steps for operating the stitching system 20. First, the material support table 22 is set up. The loft modules L1 to Ln of the tooling 34 are bolted down to the table sections S1 to Sn (step 200), and the stitching frame 36 is assembled atop the loft modules L1 to Ln (step 202). Various pieces of the preform are laid out and clamped to the stitching frame 36 (step 204). Certain pieces are stacked on other pieces, giving the preform its variable thickness. Spar caps can also be laid out. After the pieces have been laid out, the preform is checked for tightness and contour (step 206).

A dry cycle of the stitching machine 24 is then run (step 208). The dry cycle ensures that the preform holds accordingly, that it is properly fastened in the stitching frame 36, and that the pieces are properly oriented.

Next the operator sets up the stitching machine 24. For each stitching head 38, the operator inserts a needle 62, installs a spool 66 of thread, threads the needle 62, and runs a canned cycle causing a selected stitching head 38 to grip the thread 62 (step 210). The canned cycle can be run from the control station 26 or the auxiliary pendant 118. For each bobbin 40, the operator grasps the bobbin thread, and pulls out a tail (step 212).

Next the operator prepares the control station 26. The operator downloads the CNC files 106 to the control station 26 and executes the host program 104 (step 214).

Figure 13:
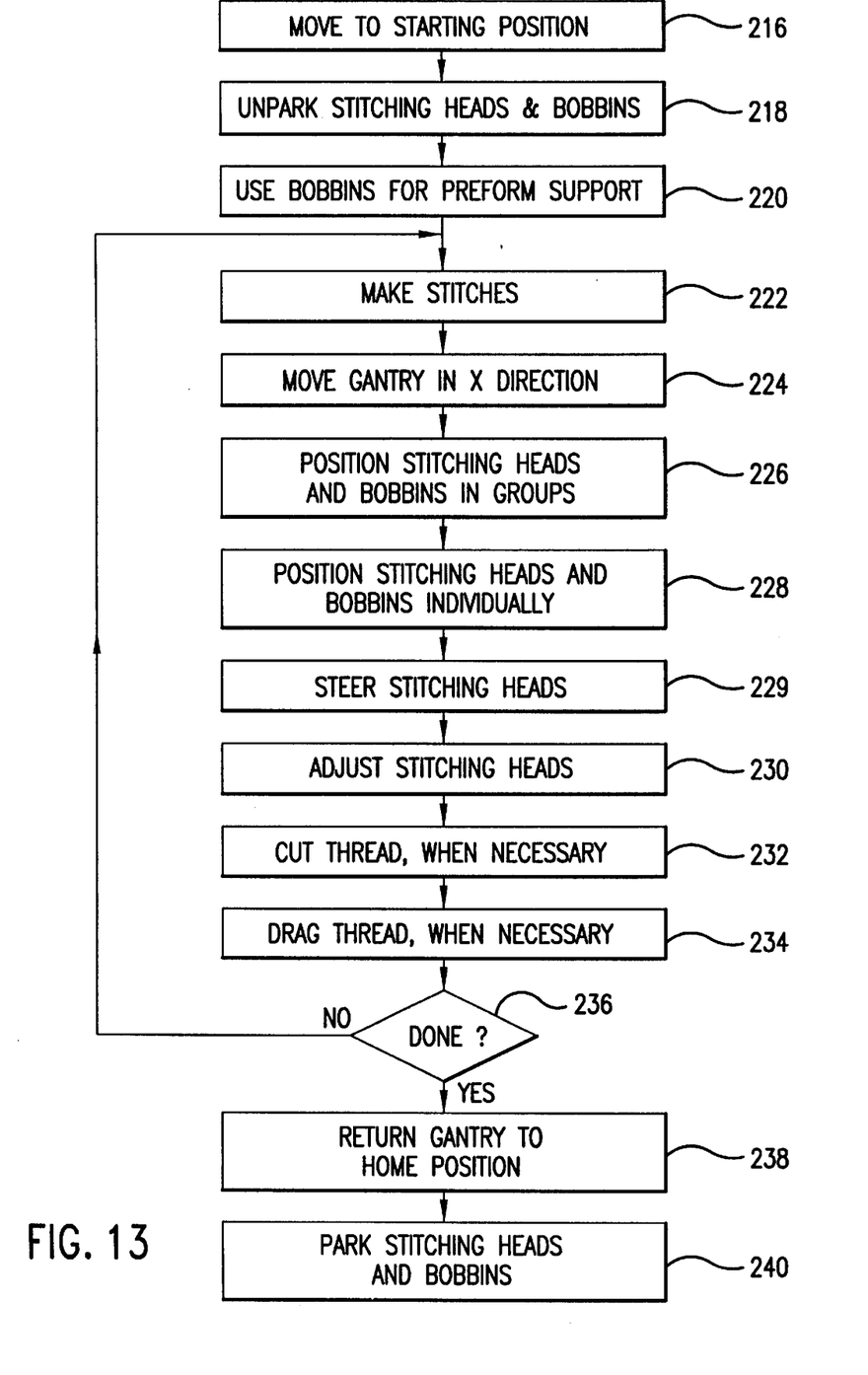
FIG. 13 is a flowchart of steps performed by the stitching machine.

FIG. 13 shows the steps performed by the stitching machine 24. The stitching machine 24 leaves its home position and moves to the appropriate starting position (step 216). The stitching heads 38 and bobbins 40 are moved as a group in the x-, y- and w-directions, and the stitching heads 38 and bobbins 40 that will be used for stitching are unparked (step 218). Unparking allows the stitching heads 38 and bobbins 40 to be moved in the c- and z-directions.

The bobbins 40 that will not be used for stitching can be used to support the preform (step 220). Thus, the bobbins 40 that will not be used for stitching are unparked and raised until coming in contact with the preform.

The stitching machine 24 begins making stitches (step 222). Under control of the control station 26, the gantry is moved along the material support table 22 (step 224), the stitching heads 38 and bobbins 40 are positioned as groups in the x-, y- and z-directions (step 126), and the stitching heads 38 and bobbins 40 are individually positioned in the z-and c-directions (step 228). Under control of the control station 26, each stitching head 38 automatically adjusts thread tension, thread path geometry, needle cooling and stitching speed according to the thickness of the preform (step 230).

If, while the gantry 28 is moving along the material support table 22, a path on the preform does not have to be stitched or one of the stitching heads 38 needs to be pulled up (e.g., to avoid tooling or a spar cap) (step 232), the thread is automatically cut and the stitching head 38 is raised.

If a short portion of the preform does not have to be stitched, the stitching head can drag the thread instead of cutting the thread (step 234). The stitching head 38 is turned off and thread tension is released, which allows the thread to be dragged. To resume stitching, the stitching head 38 is turned back on, and thread tension is reapplied.

Stitching continues until all of the files 106 have been executed (step 236). After the last file 106 has been executed, the gantry 28 is returned to its home position (step 238), and the stitching heads 38 and bobbins 40 are parked (step 240). The stitching is finished, and the stitched preform is then ready for transfer to an autoclave.

A software architecture for controlling the stitching machine 24, including the stitching heads 38, is disclosed in U.S. Ser. No. 08/995,843 filed concurrently herewith, which is also incorporated herein by reference.

Thus disclosed is a stitching system 20 that makes quality stitches, quickly and cost-effectively, in carbon-fiber preforms having large, complex contoured three-dimensional surfaces. Throughout the entire stitching process, the machine operator has minimal involvement. Practically every aspect of the stitching is controlled by the control station 26. The machine operator can simply push a button and walk away from the control station 26.

Changes and modifications can be made without departing from the spirit and scope of the invention. For example, the stitching machine 24 is not restricted to four stitching heads 38 and four bobbins 40. Any number of stitching head/bobbin pairs could be used. Each stitching head 38 and bobbin 40 can be provided with any number of axes of freedom. The material support table 22 can support any number of table sections and loft modules L1 to Ln.

Additional features can be added to the stitching system 20. The stitching machine 24 can be provided with features that facilitate process monitoring. For example, an elevated towed catwalk can be secured to the gantry 28. An operator could climb the catwalk and visually inspect the stitching heads 34 and the bobbins 36 while the stitching machine 24 is moving along the material support table 22.

In general, although a preferred embodiment of the present invention has been described in detail hereinabove, it should be clearly understood that many other variations and/or modifications of the basic inventive concepts herein taught which may appear to those skilled in the pertinent art will still fall within the spirit and scope of the present invention, as defined in the appended claims.

We claim:

1. A stitching system comprising:
   a gantry positioned with respect to a three-dimensional coordinate system having x, y, and z axes, wherein the x and y axes are perpendicular to each other and lie in a first plane, and wherein the z axis lies in a second plane that is perpendicular to the first plane;
   a plurality of stitching heads mounted to the gantry;

a plurality of bobbins mounted to the gantry, each one of the stitching heads being paired with a bobbin;

means for individually controlling movement of each of the stitching heads in a z-direction that is parallel to the z-axis;

means for individually controlling movement of each of the bobbins in the z-direction; and, wherein movement of each pair of the stitching heads and the bobbins is controlled synchronously in the z-direction.

2. The system of claim 1, further comprising a material support table, and means for moving the gantry along the material support table.

3. The system of claim 2, wherein the material support table includes a plurality of table sections, each section being movable between an extended position and a retracted position; and wherein the system further comprises means for moving the table sections between the extended and retracted positions.

4. The system of claim 3, further comprising a controller for sequencing the movement of the table sections between the extended and retracted positions in a manner such that a selected table section is moved to the retracted position to allow the gantry to move along the material support table, and such that the selected table section is moved to the extended position after the gantry has passed.

5. The system of claim 3, wherein the material support table is located on a first floor, and the means for moving the table sections are located on a second floor.

6. The system of claim 3, wherein the material support table further includes a plurality of loft modules supported by the plurality of table sections, the loft modules being movable with the table sections.

7. The system of claim 6, wherein support table further includes a stationary stitching frame disposed atop the loft modules.

8. The system of claim 2, wherein the stitching system is sized to stitch a preform for an aircraft cover panel.

9. The system of claim 1, further comprising:

means for moving the stitching heads together as a group along the y- and z-axes; and, means for moving the bobbins together as a group along the y- and z-axes.

10. The system of claim 1, wherein the gantry includes a bridge for moving the stitching heads and the bobbins together as a group in a w-direction; an upper slider for moving the stitching heads together as a group in a y-direction; and a lower slider for moving the bobbins together as a group in the y-direction.

11. The system of claim 1, wherein the stitching heads and bobbin assemblies cooperate to make loose modified Federal Type 301 Lock Stitches during operation of the stitching system.

12. The system of claim 1, wherein each stitching head includes an automatic thread tensioner and an automatic thread path geometry adjustment mechanism, whereby thread path geometry and thread tension for each stitching head are automatically adjustable.

13. The system of claim 12, wherein each stitching head further includes an automatic thread cutter, an automatic thread gripper, and an automatic needle cooler, whereby thread cutting, thread gripping and needle cooling for each stitching head are performed automatically.

14. The system of claim 12, further comprising a control station including a processor for controlling the automatic thread tensioners and the automatic thread path geometry adjustment mechanisms of each stitching head, and further, for controlling the movement of the pairs of stitching heads and bobbins with respect to the z-axis.

15. The system of claim 1, further comprising an auxiliary pendant attached to the gantry.

16. The system of claim 1, further comprising a video camera for monitoring each pair of stitching heads and bobbins.

17. A stitching system comprising:

a stitching machine including a gantry and a plurality of stitching heads mounted to the gantry;

a material support table including a plurality of table sections, each table section being independently movable between an extended position and a retracted position;

means for moving the gantry along the material support table; and, means for controlling movement of the table sections between the extended and retracted positions in a manner such that a selected table section is moved from the extended position to the retracted position to allow passage of the gantry, and such that the selected table section is moved to the extended position after the gantry has passed.

18. The system of claim 17, wherein the material support table further includes a plurality of loft modules supported by the plurality of table sections, the loft modules being movable with the table sections.

19. The system of claim 17, wherein the material support table further includes a stationary stitching frame disposed atop the loft modules.

20. The system of claim 17, wherein the gantry is positioned with respect to a three-dimensional coordinate system having x, y, and z axes, wherein the x and y axes are perpendicular to each other and lie in a first plane, and wherein the z axis lies in a second plane that is perpendicular to the first plane; and, wherein further, the stitching system further comprises:

means for moving the stitching heads together as a group along the y- and z-axes; and, means for moving the stitching heads individually with respect to the z-axis.

21. The system of claim 17, wherein the gantry includes a bridge for moving the stitching heads together as a group in a w-direction; and a slider for moving the stitching heads together as a group in a y-direction.

22. The system of claim 20, further comprising a control station including a processor for controlling the means for moving the stitching heads individually and the means for moving the stitching heads in groups.

23. The system of claim 17, wherein each stitching head includes an automatic thread tensioner and an automatic thread path geometry adjustment mechanism, whereby thread path geometry and thread tension for each stitching head are automatically adjustable.

24. The system of claim 23, wherein each stitching head further includes an automatic thread cutter, an automatic thread gripper, and an automatic needle cooler, whereby thread cutting, thread gripping and needle cooling for each stitching head are performed automatically.

25. The system of claim 23, further comprising a control station including a processor for controlling the automatic thread tensioners and the automatic thread path geometry adjustment mechanisms of each stitching head, and further, for controlling the means for moving the stitching heads individually and the means for moving the stitching heads in groups.

26. The system of claim 17, further comprising an auxiliary pendant attached to the gantry.

27. A method of using a plurality of stitching heads and a plurality of bobbins to make stitches in a preform having a variable thickness and a contoured, compound three-dimensional surface, the method comprising the steps of:

independently moving each of the stitching heads and each of the bobbin assemblies in a z-direction that is parallel to a z-axis of a three-dimensional coordinate system having x, y, and z-axes, wherein the x and y axes are perpendicular to each other and lie in a first plane, and wherein the z-axis lies in a second plane that is perpendicular to the first plane, in such a manner that each stitching head is moved synchronously with its associated bobbin;

moving each of the stitching heads and bobbin assemblies together in an x-direction that is parallel to the x-axis; and, independently controlling each of the stitching heads and each of the bobbin assemblies to make the stitches at stitching points on the preform.

28. The method of claim 27, further comprising the step of supporting the preform with bobbins that are not being used to make stitches.

29. The method of claim 27, further comprising the step of steering the stitching heads in a c-direction that is rotational about the z-axis.

30. The method of claim 27, wherein the stitching heads and bobbin assemblies cooperate to make loose modified Federal Type 301 Lock Stitches.

31. The method of claim 27, further comprising the steps of automatically adjusting thread path geometry and thread tension for each stitching head.

32. The method of claim 31, further comprising the steps of automatically performing thread cutting, thread gripping and needle cooling for each stitching head.

33. The method of claim 27, further comprising the step of monitoring each pair of stitching heads and bobbins with a video camera.

* * * * *